United States Patent
Hernández Ramos et al.

(10) Patent No.: US 8,341,894 B2
(45) Date of Patent: Jan. 1, 2013

(54) ACTIVE TRANSPARENT OR TRANSLUCENT ENCLOSURES WITH ENERGY CONTROL CAPACITY

(75) Inventors: Juan Antonio Hernández Ramos, Madrid (ES); Miguel Hermanns, Madrid (ES); Fernando Del Ama Gonzalo, Madrid (ES); César Javier Hernández Jiménez, Pozuelo de Alarcón (ES)

(73) Assignee: Universidad Politecnica de Madrid, Madrid (ES)

( * ) Notice: Subject to any disclaimer, the term of this patent is extended or adjusted under 35 U.S.C. 154(b) by 137 days.

(21) Appl. No.: 12/545,510

(22) Filed: Aug. 21, 2009

(65) Prior Publication Data

US 2010/0044006 A1 Feb. 25, 2010

Related U.S. Application Data

(63) Continuation-in-part of application No. PCT/ES2008/000071, filed on Feb. 8, 2008.

(30) Foreign Application Priority Data

Feb. 23, 2007 (ES) .................................. 200700476

(51) Int. Cl.
- *F24D 3/12* (2006.01)
- *E06B 7/00* (2006.01)
- *E06B 3/66* (2006.01)
- *E06B 3/67* (2006.01)
- *E04C 2/54* (2006.01)

(52) U.S. Cl. ...................................... 52/171.3; 52/220.1
(58) Field of Classification Search .................. 52/171.3, 52/220.1, 173.3; 165/56
See application file for complete search history.

(56) References Cited

U.S. PATENT DOCUMENTS

| | | | | |
|---|---|---|---|---|
| 4,236,360 A | * | 12/1980 | Parrier et al. | 52/171.3 |
| 4,347,835 A | | 9/1982 | Seemann | |
| 4,515,150 A | | 5/1985 | McGlew et al. | |
| 5,009,044 A | * | 4/1991 | Baughman et al. | 52/171.3 |
| 5,106,660 A | * | 4/1992 | Vorel | 428/13 |
| 5,197,242 A | * | 3/1993 | Baughman et al. | 52/171.3 |
| 5,386,672 A | * | 2/1995 | Iselin | 52/171.3 |
| 6,216,688 B1 | * | 4/2001 | Schwarz | 126/633 |
| 6,457,286 B1 | * | 10/2002 | Eliyahu et al. | 52/171.3 |

(Continued)

FOREIGN PATENT DOCUMENTS

DE 37 16 563 6/1988

(Continued)

*Primary Examiner* — Basil Katcheves
*Assistant Examiner* — Rodney Mintz
(74) *Attorney, Agent, or Firm* — Merchant & Gould P.C.

(57) ABSTRACT

An enclosure is made out of transparent or translucent panes which form a chamber (1) through which a liquid flows in closed circuit and which interchanges energy with the inner and outer environments, a heat exchanger (2) in contact with the liquid, a circulation pump (3), and a hydrostatic pressure reducer device (4). The hydrostatic pressure reducer device allows the reduction of the thicknesses of the transparent panes which hold the liquid inside. The active character of the enclosure is due to its capacity of controlling the solar heat load and the illumination. The solar heat load is regulated through the heat exchanger. The illumination of the building is controlled through the adjustable transparency of the liquid. The described enclosure allows the creation of an isothermal envelope which allows the climatization of the building. The system can be used for active outer enclosures or for interior partitions for the climatization and luminic control, as well as for glass roofs or false ceilings.

5 Claims, 4 Drawing Sheets

U.S. PATENT DOCUMENTS

| | | | |
|---|---|---|---|
| 6,789,362 B1 * | 9/2004 | Hessabi | 52/171.3 |
| 7,106,489 B2 | 9/2006 | Berneth et al. | |
| 2003/0206326 A1 | 11/2003 | Berneth et al. | |
| 2005/0117193 A1 | 6/2005 | Poll et al. | |
| 2005/0200935 A1 | 9/2005 | Liu et al. | |
| 2007/0251164 A1 * | 11/2007 | Egeresi | 52/171.3 |
| 2008/0110109 A1 * | 5/2008 | Hermens | 52/171.3 |
| 2008/0163570 A1 * | 7/2008 | Matoses Vercher et al. | 52/171.3 |
| 2011/0308513 A1 * | 12/2011 | Martinez-Val Pe alosa | 126/655 |

FOREIGN PATENT DOCUMENTS

| | | |
|---|---|---|
| DE | 38 18 543 | 12/1989 |
| DE | 3923395 C1 * | 2/1991 |
| DE | 41 07 943 | 9/1992 |
| DE | 198 29 480 | 1/2000 |
| DE | 198 47 634 | 2/2000 |
| DE | 199 26 343 | 12/2000 |
| DE | 100 23 765 | 11/2001 |
| DE | 100 34 764 | 12/2001 |
| DE | 10157843 A1 * | 6/2003 |
| DE | 10347163 A1 * | 4/2005 |
| DE | 103 51 023 | 6/2005 |
| EP | 0 075 464 | 3/1983 |
| EP | 0 402 529 | 12/1990 |
| EP | 445314 A1 * | 9/1991 |
| EP | 0 978 620 | 2/2000 |
| EP | 1 367 210 | 12/2003 |
| EP | 1813762 A1 * | 8/2007 |
| ES | 2 158 757 | 9/2001 |
| ES | 2 180 444 | 2/2003 |
| FR | 2.176.916 | 11/1973 |
| FR | 2667349 A1 * | 4/1992 |
| FR | 828 509 | 2/2003 |
| FR | 2851002 A1 * | 8/2004 |
| GB | 1 424 533 | 2/1976 |
| GB | 2227043 A * | 7/1990 |
| GB | 2270106 A * | 3/1994 |
| GB | 2310880 A * | 9/1997 |
| GB | 2450474 A * | 12/2008 |
| JP | 2000027548 A * | 1/2000 |
| JP | 2000027549 A * | 1/2000 |
| WO | WO 9206266 A1 * | 4/1992 |
| WO | WO 99/63195 | 12/1999 |
| WO | WO 2005/076061 | 8/2005 |
| WO | WO 2006/004587 | 1/2006 |
| WO | WO 2006070159 A1 * | 7/2006 |
| WO | WO 2008000084 A1 * | 1/2008 |

* cited by examiner though an isothermal envelope, all this done with an eco-# ACTIVE TRANSPARENT OR TRANSLUCENT ENCLOSURES WITH ENERGY CONTROL CAPACITY This application is a Continuation-in-Part of PCT/ES2008/000071, filed 8 Feb. 2008, which claims benefit of Serial No. P200700476, filed 23 Feb. 2007 in Spain and which applications are incorporated herein by reference. To the extent appropriate, a claim of priority is made to each of the above disclosed applications.

FIELD OF THE INVENTION

The present invention belongs to the technical fields of building construction and climatization. Specifically, the application centers in transparent or translucent enclosures capable of controlling the outer and inner heat loads and the illumination of the building with the aim of achieving energy savings in climatization and improved comfort conditions.

BACKGROUND OF THE INVENTION

The massive use of glass enclosures in contemporary architecture has originated large energy consumptions in buildings and an important reduction in comfort. The low thermal insulation of the glass elements combined with their uncontrolled permeability to solar radiation are the reasons for their bad energetic behavior. The worldwide trend to save energy in buildings, motivated by the energy scarcity and the contamination constraints, has triggered in recent years the development of intelligent transparent enclosures which allow to control the entrance of light and of the direct solar radiation.

As an example of these novel transparent enclosures, enclosures have been developed which increase the thermal insulation through the inclusion of layers and different materials forming a multilayer panel, as the ones described in the patents FR2828509, DE10034764, DE19829480, and DE19847634. Another type of intelligent transparent enclosures try to seek the control of illumination and thermal load by means of one or more fluids of different colors, fluids with variable transparency properties or through curtains integrated into the enclosure. The following patents are remarkable examples of this type of intelligent enclosure: U.S. Pat. No. 4,347,835, DE3716563, EP0402529, EP1367210, ES2158757, U.S. Pat. No. 4,347,835, WO200604587, DE10351023, DE3716563, DE3818543, and WO9963195. Another family of active glazings includes a circulating fluid in contact with a heat exchanger. These glazings allow the control of the thermal load and serve also as radiating surfaces for heating and cooling purposes. Examples of this family are the patents EP0075464, U.S. Pat. No. 4,515,150, DE19926343, DE4107943, and ES2180444. Last, another group of glazings achieve the illumination control by including an electrochromic layer adhered to the transparent panes. Examples of this solution are the patents DE10023765, US2005200935, WO2005076061, and US2005117193.

It is therefore desirable to have an intelligent transparent enclosure which allows the regulation of the building illumination and block or control the entrance and exit of heat through an isothermal envelope, all this done with an economic and versatile transparent system or enclosure of reduced thickness. The necessity to control the solar radiation through the convective transport in a chamber of reduced thickness requires a circulating fluid with a large thermal heat capacity, and therefore, with a large density, like a liquid.

Hence, patent DE3716563 describes a transparent enclosure with many of the sought features, where a liquid is heated by the incoming solar radiation while it crosses the interior of the enclosure. At the exit of the enclosure the liquid is driven to a heat exchanger for the evacuation of the absorbed heat and thereafter returned to the enclosure. The so formed closed circuit is kept in motion by using a circulation pump.

But the presence of the liquid in the interior of the enclosure leads to significant hydrostatic pressures which require the use of transparent panes with large thicknesses in order to avoid their breakage. This problem is present in all the cited patents in which one or several liquids are in between the two transparent panes, making the realization of these inventions economically enviable in the formats and sizes common in architecture.

The present invention differs from the cited patents in that in reduces the hydrostatic pressure supported by the transparent panes and induced by the liquid in the closed circuit. The reduction of the supported hydrostatic pressure, and therefore of the required thicknesses of the transparent panes, allows the consecution of an economical intelligent enclosure system with luminic and calorific energy management capabilities.

Other technological solutions exist which allow the construction of transparent enclosures in formats and sizes common in architecture. The patent considered most close to the actual state of the art is FR2176916. In this patent the hydrostatic pressure problem is solved by imposing the atmospheric pressure at the bottom of the enclosure, so that the glass panes are exposed to a depression instead of an overpressure. In order to avoid the breaking of the panes, the patent introduces spacers between the panes to keep them in place and hence reduce their effective span. The main difference with the present invention is that the latter sets the atmospheric pressure at the vertical center of the enclosure. In this way the panes are exposed to depression in their upper half part and to overpressure in their bottom half part, leading to a zero resulting force. The consequence of this subtle, but transcendental change is a radically different load state of the panes, leading to much smaller deflections, and therefore stresses. The absence of spacers to solve the problem induced by the hydrostatic pressure represents an important technological advantage in economic, constructive, manufacturing and esthetic terms.

The invention described in the present patent has four fundamental advantages compared to the similar inventions described before. First, it allows the blockage of an important part of the incoming radiation energy and its transfer to another system, avoiding the temperature increase inside the building. Second advantage is the hydrostatic pressure reducer device which allows the use of reduced thicknesses in the panes that contain the liquid, and with it the cost, weight, and complexity of the enclosure. The third advantage is an energetic one, as the energy requirements for climatization of the interior of the building are significantly reduced, leading to savings in cooling and heating. Fourth advantage is the modular design, which allows an independent manufacture and ensures a maintainability of the system: the breaking of one module does not imply the failing of the complete system, and the repairing can be performed independently without affecting the working of the rest of the system.

SUMMARY OF THE INVENTION

The active transparent enclosures with luminic and calorific energy management capabilities are characterized by the presence of a fluid, which manages the calorific energy through the convective transport of heat, and a dimming device in charge of controlling the illumination level. The active character of the enclosure is associated with its capability of controlling the incoming solar thermal load and illumination through an external regulation system. In order to accomplish the convective transport of heat with a chamber of reduced thickness, the fluid has to be a liquid. The hydrostatic pressure generated by the liquid in a vertical enclosure requires large thicknesses for the transparent panes, which renders the invention economically enviable.

The present invention tries to solve the mentioned problems by means of an active transparent enclosure formed by two transparent panes fixed to a frame through which a liquid flows in a closed circuit, and a hydrostatic pressure reducer device connected to the closed circuit. The frame serves as structural element to keep together the transparent panes and additionally is part of the closed circuit of the system. The chamber (1) build up by the two transparent panes, is fed through the inlet holes (6) of the distributor (5). The liquid crosses the outlet holes (7) and is gathered by the collector (8). The exit of the collector is connected to a circulation pump (3), which pumps the liquid to the heat exchanger (2). Finally, the exit of the heat exchanger is connected directly to the distributor.

In summertime, the heat exchanger evacuates the thermal load absorbed by the liquid during its passing through the chamber. In wintertime, the heat exchanger supplies heat to the liquid so that it is freed to the interior of the building. In this way, the chamber behaves like a cold or warm radiation panel inside the building. The liquid temperature inside the chamber is controlled by the circulating velocity, governed by the power supplied to the circulation pump, and by the temperature of the warm or cold foci connected to the heat exchanger.

In order to reduce the hydrostatic pressure in the closed circuit, and therefore, the thicknesses of the transparent panes, the very frame includes a hydrostatic pressure reducer device (4) connected to the chamber through a perforation (9). In this way, the hydrostatic pressure at the bottom of the chamber is regulated by the height of the liquid column (10), as shown in FIG. 4. The height of the liquid column is optimized such that the internal stresses of the transparent panes are minimal.

By a height that "is optimized to minimize the displacements, and consequently the stresses, of the panes", as used in the present patent application, is understood the height of the liquid column that results from the design process of the hydrostatic pressure reducer device that leads to internal stresses of the panes whose maximum absolute value is the lowest possible one among all the maximum absolute values that result from considering all the possible heights of the liquid column between the bottom and the top of the enclosure.

This optimization of the height of the liquid column is performed as follows. The elastic response of the transparent pane of the active enclosure is obtained by solving the following mathematical problem arising from plate theory $$\frac{\partial^2 w}{\partial x^2} + \frac{\partial^2 w}{\partial y^2} = -\frac{M}{D}$$

$$\frac{\partial^2 M}{\partial x^2} + \frac{\partial^2 M}{\partial y^2} = p(x, y)$$

$$x = 0, 0 \le y \le H : w = 0, M = 0$$

$$x = L, 0 \le y \le H : w = 0, M = 0$$

$$y = 0, 0 \le x \le L : w = 0, M = 0$$

$$y = H, 0 \le x \le L : w = 0, M = 0$$

where $D=Ee^3/(12(1-v^2))$ is the bending rigidity of the transparent pane (being E its elastic modulus, e its thickness, and v its Poisson's ratio), w is the displacement of the pane, M is the generalized moment, x and y are the horizontal and vertical coordinates, respectively, L and H are the width and height of the enclosure, respectively, and p(x,y) is the acting pressure distribution result from the combination of the internal hydrostatic pressure and the external atmospheric pressure:

$$p(x,y)=Pg(h_1-y)$$

being p the density of the liquid, g the gravity constant, and h.sub.1 the height of the liquid column. The optimization of the height of the liquid column consists in searching for the height h.sub.1 that minimizes the displacements w of the transparent layer, and therefore, its stresses. The considered mathematical problem has an analytical solution, known as Navier's solution, which shows that the optimum height corresponds to H/2, the vertical center point of the enclosure.

Thanks to the optimization process of the liquid column's height, an important reduction in the required thicknesses e to avoid the breakage of the panes is achieved. In order to understand this reduction it is convenient to remind that in a loaded plate one of its faces is compressed and the other one is stretched, being the latter the critical one. The maximum stresses present in the material depend on the thickness e and on the bending moments obtained from the solution to the problem. The present invention, with its process of minimizing the displacements w, minimizes also the acting bending moments, which translates into lower stresses in the transparent panes. Hence, given the breaking stress of the material, the present invention allows the use of thinner panes.

Another important characteristic of the load state result from the optimization process is that the net resulting force is zero, which translates into reduced reactions at the borders of the transparent pane. Again, given the breaking stress of the material employed for the peripheral sealing, the present invention allows the use of reduced depths in the peripheral sealing.

To better illustrate the advantages resulting from the optimization process of the liquid column's height, consider a 3.28 feet (1 m) width and 6.56 feet (2 m) height enclosure made out of glass panes, filled with water, and sealed with a silicone sealant. The present invention allows the reduction of the thickness of the glass panes from 0.984 in. (25 mm) to 0.472 in. (12 mm), which translates into reduced costs and weight. Additionally, the depth of the peripheral sealing required to support the reactions can be reduced from 1.1 in. (28 mm) to 0.394 in. (10 mm). Comparing with patent FR2176916 and employing in both cases the same glass pane thickness of 0.472 in. (12 mm), the present invention allows to dismiss the three spacers required by the cited patent to avoid the breakage of the glass panes, which represents a significant advantage from the manufacturing and complexity points of view.

In the case in which the enclosure is placed horizontally for its use in glass roofs or false ceilings in buildings, the hydrostatic pressure reducer device (4) can be omitted.

Additionally, the present enclosure can be used as interior partitions for the climatization and the luminic control of the interior of the building.

In order to regulate the illumination in the building, the color and transparency of the flowing liquid in the closed circuit is controlled.

DETAILED DESCRIPTION OF THE PREFERRED EMBODIMENTS

Figure 1:
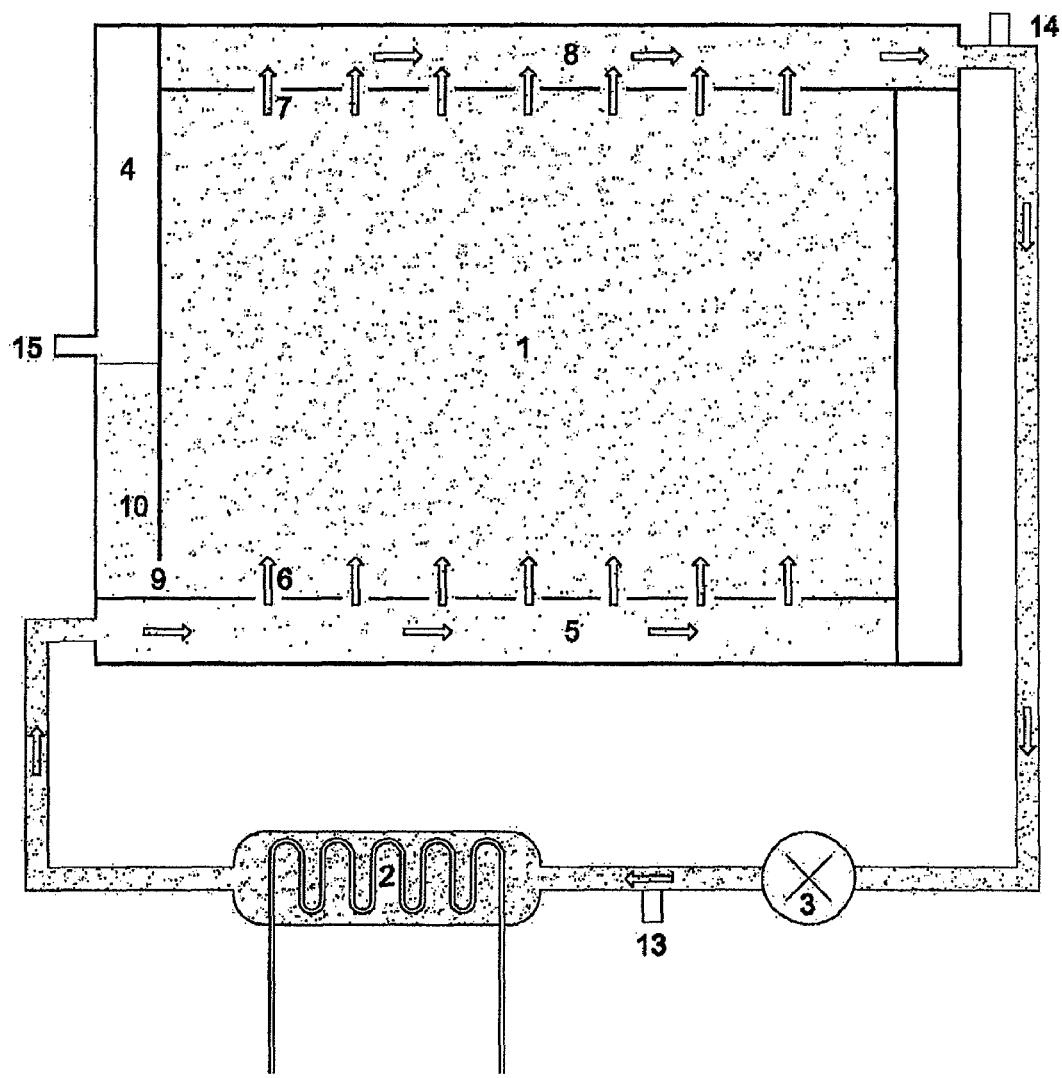
FIG. 1: Longitudinal section of the frame and description of the elements required for the filling, circulation of the liquid, and reduction of the hydrostatic pressure between the two transparent panes.
Figure 2:
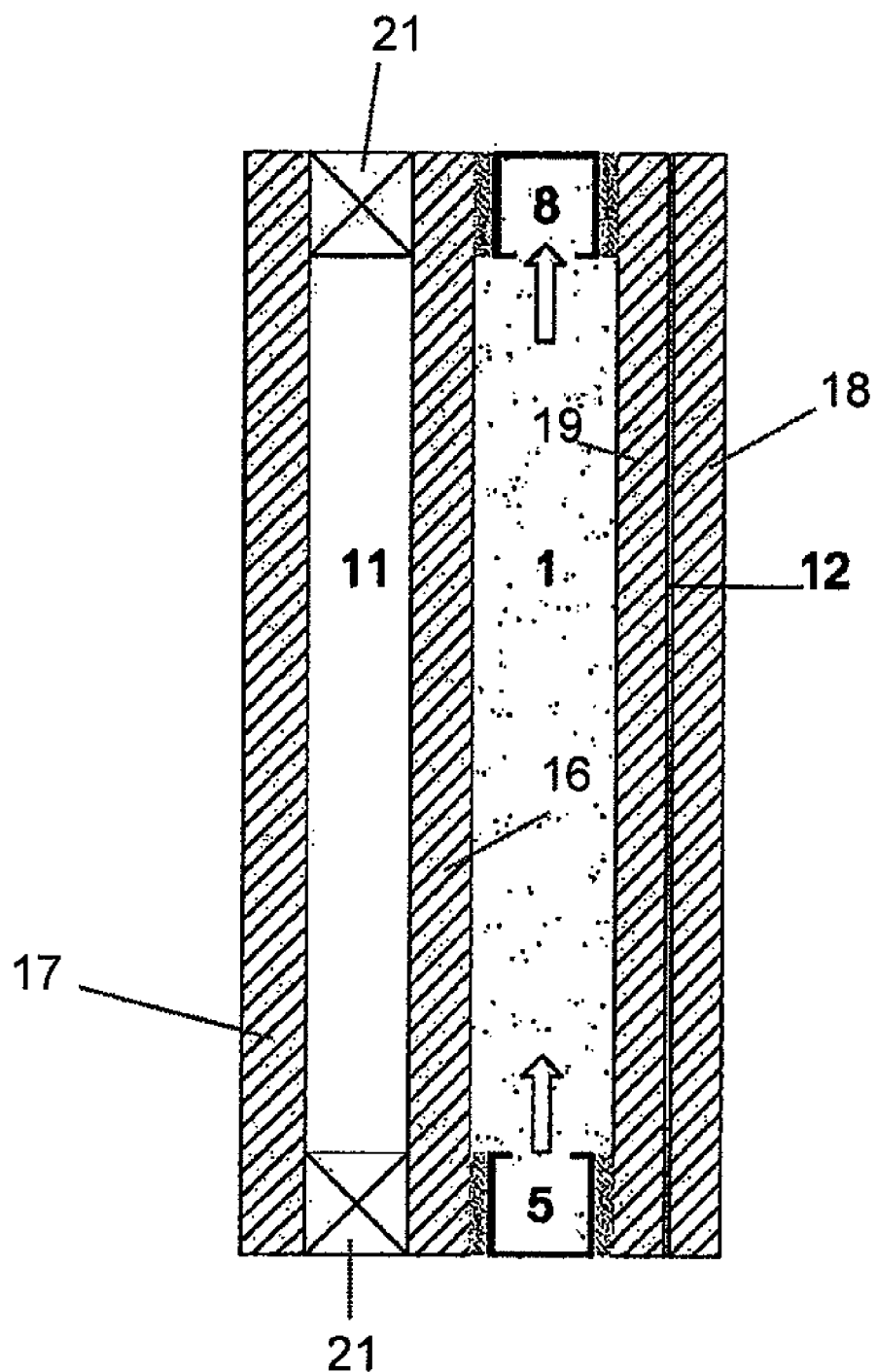
FIG. 2: Transversal section of the frame and the transparent panes.

In order to present one embodiment, an enclosure for outer facades is considered. In this case, the system incorporates a double glass insulating unit with a gas chamber (11), comprised by elements (16), (17) and (21) which increases the insulating function and is in contact with the exterior. Instead, if the system is used as an interior partition, then the inclusion of the double glazing unit with gas chamber is not required, and both faces of the water chamber would act as radiating surfaces towards the interior of the building.

An aluminum frame (20) is build out of rectangular hollow beams: the two horizontal beams form the distributor (5) and collector (8) and one of the vertical beams forms the hydrostatic pressure reducer device (4). Next, a double glazing unit is fixed on one of the sides of the frame and on the other side a laminated glass formed by two glass planes (18) and (19) joined together with a Poly Vinyl Butyral layer (12). In the present embodiment a colored Butyral is chosen in order to statically control the illumination.

The distributor presents a series of inlet holes (6) on its upper face which allow the entrance of the water to the chamber (1) build up by the glass panes and the frame. Similarly, the collector presents a series of outlet holes (7) on its lower face which allow the gathering of the water for its subsequent return. The diameter and interspacing of the holes in the distributor and collector are optimized such that the flow in the chamber is uniform, and the localized pressure drop minimal. The hydrostatic pressure reducer device is attached to the closed circuit only through a perforation (9) localized at the bottom part of the chamber, and the water inside the reducer does not circulate.

The water gathered by the collector is taken to a circulation pump (3), which pumps the water through a heat exchanger (2). Finally, the outlet of the heat exchanger is connected to the distributor. The described system builds a closed circuit.

Figure 3:
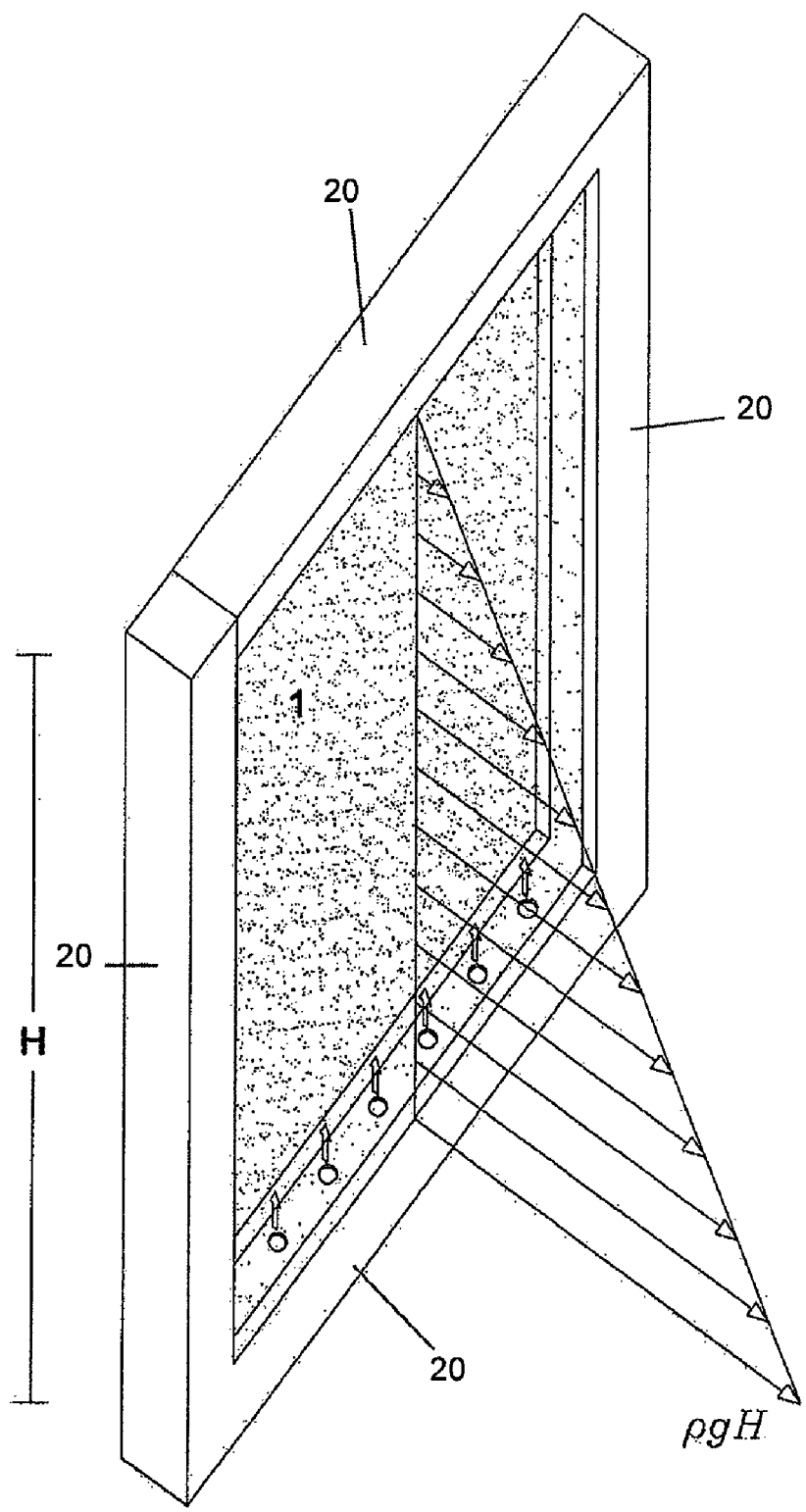
FIG. 3: Diagram of the hydrostatic pressure distribution induced by the liquid inside the chamber in the absence of the hydrostatic pressure reducer device.
Figure 4:
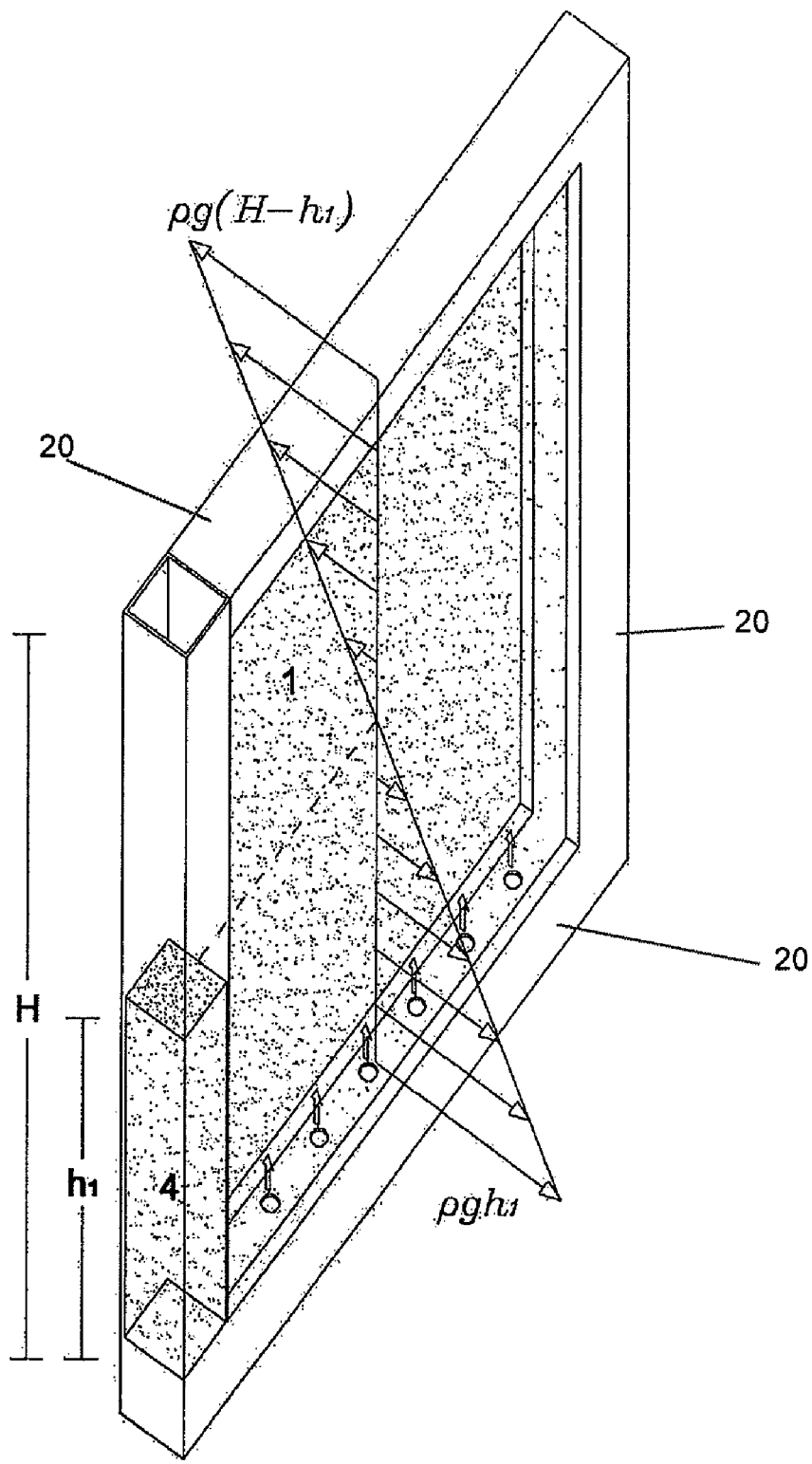
FIG. 4: Diagram of the hydrostatic pressure distribution induced by the liquid inside the chamber in the presence of the hydrostatic pressure reducer device.

The filling of the system is performed through the filling valve (13). The purging valve (14) allows the air to exit during the filling of the system. During the filling process, the spillway (15) remains closed. Due to the hydrostatic pressure that builds up in the chamber, whose distribution is shown in FIG. 3, the glass panes get deflected to the outside. Hence, the introduced volume of water is larger than the one corresponding to the non-deflected state. Once the filling process is finished, the filling valve and the purging valve are closed. Through the opening of the spillway the water excess is discharged reducing therefore the initial deflection. The spillway remains open till the height of the water column reaches the height of the spillway. The final height of the water column (10) is optimized to reduce the stresses supported by the glass panes following the procedure described in the present invention. Therefore, the spillway (15) is placed at the vertical center of the enclosure. From the point of view of pressures, the net pressure acting on each of the glass panes is the triangular distribution shown in FIG. 4, whose resultant force is zero.

The infrared component of the incoming solar radiation is absorbed by the water due to its impermeability to the infrared spectrum. The energy absorbed in the visible spectrum is partly absorbed by the colored Butyral layer. In this way, the radiation energy is transformed into calorific energy which increases the water temperature. The forced circulation of the water transports the absorbed heat to the heat exchanger, which cools down the water before its return to the chamber. For radiation levels around 500-1000 W/m.sup.2 (158.55-317.10 Btu/(h ft$^2$)), a water flow rate of 0.05-0.1 kg/(s m.sup.2) (0.01-0.02 lbm/(s ft$^2$)) is sufficient to transport all the absorbed energy by the water and to ensure temperature variations of the water inside the chamber below two degrees Celsius (3.6 degrees Fahrenheit).

In the absence of outer solar radiation, the water is circulated through the chamber at a prescribed temperature controlled by the temperature of the secondary flow of the heat exchanger. Depending on the temperature of the water, the radiating chamber cools or heats the interior spacing. The insulating glass unit with its gas chamber reduces the heat losses towards the exterior.

INDUSTRIAL APPLICATION

The present invention can be used in the construction sector, for new constructions as well as for renovations of all types of buildings. It can be used in all types of transparent or translucent enclosures: windows, balconies, greenhouses, skylights, curtain walls, interior partitions, shop windows, showcases, and display stands, for interiors as well as for exteriors.

The invention claimed is:

1. An active enclosure for use in buildings comprising:
    two transparent or translucent panes having a top and a bottom defining a height dimension, and fixed to a frame that build up a liquid chamber through which a liquid flows in closed circuit and free or absorb energy from outer and inner environments;
    a hydrostatic pressure reducer device connected to the liquid chamber through a perforation, the hydrostatic pressure reducer device housing a liquid column separate from the liquid chamber, wherein the liquid column has a constant height equal to one half of the height dimension between the top and the bottom of the transparent or translucent panes;
    wherein said closed circuit comprises the liquid chamber fed through inlet holes of a distributor, a collector gathering the liquid coming from the liquid chamber through outlet holes and whose exit is connected to a circulation pump, a heat exchanger fed by the circulation pump and whose outlet is connected to the distributor.

2. The active enclosure of claim 1, wherein said enclosure is used as interior partitions for climatization and luminic control of an interior of the building.

3. The active enclosure of claim 1, wherein said enclosure comprises the liquid whose color and transparency can be regulated.

4. An active enclosure for use in buildings comprising:

a transparent or translucent pane having a top and a bottom defining a height dimension, and a double glass insulating unit with a gas chamber fixed to a frame that build up a liquid chamber through which a liquid flows in closed circuit, wherein the transparent or translucent pane frees or absorbs energy from an inner environment and the double glass insulating unit frees or absorbs energy from an outer environment;

a hydrostatic pressure reducer device connected to the liquid chamber through a perforation, the hydrostatic pressure reducer device housing a liquid column separate from the liquid chamber, wherein the liquid column has a constant height equal to one half of the height dimension between the top and the bottom of the transparent or translucent pane;

wherein said closed circuit comprises the liquid chamber fed through inlet holes of a distributor, a collector gathering the liquid coming from the liquid chamber through outlet holes and whose exit is connected to a circulation pump, a heat exchanger fed by the circulation pump and whose outlet is connected to the distributor.

5. An active enclosure for use in buildings comprising:

a transparent or translucent pane having a top and a bottom defining a height dimension, and a double transparent pane joined together with a colored Poly Vinyl Butyral layer fixed to a frame that build up a liquid chamber through which a liquid flows in closed circuit and free or absorb energy from outer and inner environments;

a hydrostatic pressure reducer device connected to the liquid chamber through a perforation, the hydrostatic pressure reducer device housing a liquid column separate from the liquid chamber, wherein the liquid column has a constant height equal to one half of the height dimension between the top and the bottom of the transparent or translucent pane;

wherein said closed circuit comprises the liquid chamber fed through inlet holes of a distributor, a collector gathering the liquid coming from the liquid chamber through outlet holes and whose exit is connected to a circulation pump, a heat exchanger fed by the circulation pump and whose outlet is connected to the distributor.

* * * * *